United States Patent
Becker et al.

(10) Patent No.: US 8,434,788 B2
(45) Date of Patent: May 7, 2013

(54) LENGTH ADJUSTABLE STEERING COLUMN MODULE FOR A MOTOR VEHICLE

(75) Inventors: Burckhard Becker, Solingen (DE); Thomas Arndt, Monheim (DE); Alexei Ovseenko, Köln (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 123 days.

(21) Appl. No.: 13/091,564

(22) Filed: Apr. 21, 2011

(65) Prior Publication Data
US 2011/0260438 A1 Oct. 27, 2011

(30) Foreign Application Priority Data
Apr. 23, 2010 (DE) .......................... 10 2010 028 166

(51) Int. Cl.
| B62D 1/181 | (2006.01) |
| B62D 1/185 | (2006.01) |
| B62D 1/189 | (2006.01) |
| B62D 1/19  | (2006.01) |

(52) U.S. Cl.
USPC .............................. 280/777; 280/775; 74/493

(58) Field of Classification Search ................... 280/777, 280/775; 74/493, 492; *B62D 1/181*
See application file for complete search history.

(56) References Cited

U.S. PATENT DOCUMENTS

| 3,373,630 | A | * | 3/1968 | Heurtebise ...................... 74/492 |
| 3,492,888 | A | * | 2/1970 | Yoshihiro et al. ................ 74/492 |
| 3,495,474 | A | * | 2/1970 | Yoshihiro et al. ................ 74/492 |
| 3,748,922 | A | * | 7/1973 | Farrell ............................. 74/492 |
| 4,598,604 | A | * | 7/1986 | Sorsche et al. ................... 74/493 |
| 6,142,523 | A | * | 11/2000 | Bathis et al. ................... 280/777 |
| 2006/0243089 | A1 | * | 11/2006 | Cymbal et al. .................. 74/493 |
| 2008/0229866 | A1 | | 9/2008 | Cymbal et al. |

FOREIGN PATENT DOCUMENTS

| DE | 102007042737 | | 11/1974 |
| WO | WO 9009296 A1 | * | 8/1990 |

* cited by examiner

*Primary Examiner* — Paul N Dickson
*Assistant Examiner* — Keith Frisby
(74) *Attorney, Agent, or Firm* — McCarter & English, LLP (57) ABSTRACT

A length adjustable steering column module for a motor vehicle has a support beam attachable to the motor vehicle. The module includes a steering column rotatable about a longitudinal axis, and has an upper and a lower steering tube. The upper steering tube is displaceable in the direction of the longitudinal axis and is non-rotatably connected to the lower steering tube. An adjusting device adjusts the distance of the upper steering tube from the lower steering tube. A jacket tube has an annular area, a crash member, and an upper and a lower end portion, the upper end portion grasps around the upper steering tube, and axially fixes and rotatably supports the upper steering tube. A central bearing is disposed between the annular area and the upper steering tube. The crash member, located between the central bearing and the lower end portion, shortens in the event of an accident.

10 Claims, 8 Drawing Sheets

Prior Art

Fig. 8 Prior Art

LENGTH ADJUSTABLE STEERING COLUMN MODULE FOR A MOTOR VEHICLE

CROSS-REFERENCE TO RELATED APPLICATIONS

This application claims priority under 35 U.S.C. §§119(a-d) to German Application No. DE 10 2010 028 166.2, filed Apr. 23, 2010, the contents of which are hereby incorporated by reference in its entirety as part of the present disclosure.

FIELD OF THE INVENTION

The invention relates to a length adjustable steering column module for a motor vehicle, which comprises a) a support beam to be attached to the motor vehicle, b) a steering column that is rotatable about a longitudinal axis and comprises an upper steering tube and a lower steering tube, wherein the upper steering tube is displaceable in the direction of the longitudinal axis and is non-rotatably connected to the lower steering tube, c) an adjusting device for adjusting the distance of the upper steering tube from the lower steering tube, and d) a jacket tube having an upper end portion and a lower end portion, wherein the upper end portion grasps around the upper steering tube and the lower end portion grasps around the lower steering tube, the upper end portion axially fixes and rotatably supports the upper steering tube and the upper steering tube protrudes from the upper steering area.

BACKGROUND OF THE INVENTION

A motor-operated steering column adjusting device for such a steering column module is known from DE 10 2007 042 737 A1. The known steering column-adjusting device comprises a support beam to be attached to the vehicle and a jacket tube. The latter is adjustable not only in its longitudinal direction, but also in its inclination relative to the support beam, so that a height adjustment of a steering wheel is also accomplished. An appropriate drive is also provided for this purpose.

Such steering column modules enable a convenient adaptation to the respective requirements of the user. There are manual and motor-operated designs; the latter can also be controlled via a memory. Generally, electric motors are provided as the motors. A length adjustable steering column is known from U.S. Publication No. 2008/0229866A1.

Efforts are being made to equip such steering column modules with effective safety features. For example, the length of the steering column is supposed to be able to shorten in the event of an accident. For this purpose, at least one crash member is provided that has normally solid areas, which, however, yield in the event of an accident of the vehicle. This accident includes a severe accident in which crash sensors of the vehicle are triggered and may even include a less severe accident without triggering the air bags. The solid areas are disposed at suitable locations. However, it is intended to manufacture the steering column module with high rigidity so that precise steering that is free from play is possible at all times. This requirement stands in contrast to yielding areas, as they are necessary for crash members. It is somewhat difficult to form the crash member in this way and at a desired location, so that they are sufficiently rigid up to a certain threshold, but sufficiently yielding above the threshold. The threshold is in this case determined by a measure for an accident, for example, the threshold is selected at which other safety features of the motor vehicle, such as airbags, are triggered.

Thus, the invention aims at reconciling or combining the partially conflicting requirements for a sufficiently rigid, precise steering action and an area that yields in the event of a crash.

SUMMARY OF THE INVENTION

Accordingly, it is an object of the present invention to overcome one or more of the above-described drawbacks and/or disadvantages of the prior art, to provide a steering column module that maintains stability and precision, and yields in the event of an accident, yet the yielding properties and the steering precision do not adversely affect each other.

A length adjustable steering column module for a motor vehicle, comprises a) a support beam to be attached to the motor vehicle, b) a steering column that is rotatable about a longitudinal axis and comprises an upper steering tube and a lower steering tube, wherein the upper steering tube is displaceable in the direction of the longitudinal axis and is non-rotatably connected to the lower steering tube, c) an adjusting device for adjusting the distance of the upper steering tube from the lower steering tube, d) a jacket tube having an upper end portion and a lower end portion, wherein the upper end portion grasps around the upper steering tube and the lower end portion preferably grasps around the lower steering tube, the upper end portion axially fixes and rotatably supports the upper steering tube, and the upper steering tube protrudes from the upper steering area, and e) a central bearing that is disposed between an annular area of the jacket tube and the upper steering tube, wherein the jacket tube comprises a crash member, which is located between the central bearing and the lower end portion and which shortens in the event of an accident, so that the total length of the upper and the lower steering tube is shorter after an accident than before an accident.

In this steering column module, the jacket tube itself defines the crash member. In this case, the crash member is formed in a portion of the jacket tube, namely in a portion that has virtually no significance for the strength and precision of the steering system and has reduced or no influence thereon. The rigidity and precision of the steering system can be co-determined by the part of the jacket tube located above the crash member. The crash member is substantially not included in the strength chain determining the precision and rigidity of the steering system. However, the crash member is included in the length adjusting system. However, only its axial stability is required in this regard; the torsional rigidity and bending rigidity of the jacket tube in the area of the crash member are generally not important.

In some embodiments, the crash member and jacket tube are integrally interconnected and/or made from the same material. Integrally interconnected means that the crash member and jacket tube are made as one single piece. This wording is not to distract from the fact that the jacket tube is chosen as the general term and the crash member is a portion of the jacket tube.

In some embodiments, the steering column module comprises a slide ring that grasps around the jacket tube and is displaceable relative to the jacket tube in the direction of the longitudinal axis, but not rotatable. In this case, the crash member is located on the side of the slide ring facing away from the upper steering tube. The rigidity of the steering system is in this case substantially influenced by the rotary mounting of the upper steering tube in the upper steering area and the cooperation of the slide ring and the jacket tube, but only partly influenced by the part of the jacket tube that protrudes in a downward direction over the slide ring. In further embodiments, the upper steering tube is rotatably mounted at two different places in the jacket tube.

In other embodiments, the steering column module also has an inclination adjustment or height adjustment system. To this end, a swivel bridge may be provided. The swivel bridge is connected to the support beam so as to be pivotable about a support beam axis. The support beam axis in this case runs parallel to a y-axis. The swivel bridge is connected to the slide ring so as to be pivotable about a swivel axis. This swivel axis is also parallel to the y-axis.

In the present disclosure, the x-y-z coordinate system customary in automotive engineering is generally used. The x-direction is the normal driving direction for the straight travel of the vehicle; it lies in a horizontal plane. The y-axis runs at an angle of 90° relative thereto; it also lies in the horizontal plane. The z-direction protrudes in an upward direction; all three directions form a right-handed coordinate system.

In another embodiment, a length adjustable steering column module for a motor vehicle comprises a) a support beam to be attached to the motor vehicle, b) a steering column that is rotatable about a longitudinal axis and comprises an upper steering tube and a lower steering tube, wherein the upper steering tube is displaceable in the direction of the longitudinal axis and is non-rotatably connected to the lower steering tube, c) an adjusting device for adjusting the distance of the upper steering tube from the lower steering tube, d) a jacket tube having an upper end portion and a lower end portion, wherein the upper end portion grasps around the upper steering tube and the lower end portion preferably grasps around the lower steering tube, the upper end portion axially fixes and rotatably supports the upper steering tube, and the upper steering tube protrudes from the upper steering area, and the lower end portion comprises a thread, e) a swivel part connected with the support beam so as to be pivotable about a swivel part axis, wherein the swivel part axis runs parallel to the y-axis, and f) a threaded connector which is in engagement with the thread of the lower end portion, which is rotatably arranged on the swivel part, and which has a rotation axis that coincides with the longitudinal axis.

This embodiment has the advantage of the longitudinal adjustment forces being introduced coaxially into the jacket tube. In other steering column modules known from the prior art, the drives for a longitudinal adjustment are disposed laterally on the jacket tube. Thus, the adjusting forces do not act on the same axis as the axis of the jacket tube, but with a lateral offset. Accordingly, the mechanical support of the jacket tube is not the same in all rotary positions. It depends on the angle. The invention avoids this drawback. This results in the advantage that the crash member only needs to be designed for axial loads; lateral forces as they arise in the case of a non-axial support do not occur.

In some embodiments, the jacket tube is divided into a compression area, namely the area of the crash member, and a solid area located above the crash member and, in certain embodiments, between the slide ring and the upper end portion. Thus, the crash member may be adapted to the requirement that, in the case of an accident, the steering column can shorten while absorbing energy, without having to take the rigidity of the steering system into account to a significant extent. Conversely, this also applies for the rigidity of the steering system, which does not have to take the crash member into account to a significant extent.

The two steering tubes may be coaxially interconnected through a non-rotatable slide connection. The longitudinal adjustment relative to the lower steering tube of the upper steering tube and the steering wheel to be attached thereto is thus accomplished. The lower steering tube is rotatably mounted in the support beam and does not move in the direction of the longitudinal axis relative to the support beam. However, it can be pivoted relative to the support beam if a height adjusting system is additionally provided.

The two steering tubes may be interconnected through a sliding coupling formed by the two non-circular coupling areas. They are in engagement with each other in the area of the overlap. This engagement takes place over a distance that at least corresponds to the distance of the longitudinal adjustment of the steering column module.

A threaded adjustment is provided in some embodiments for adjusting the distance between the two steering tubes. For this purpose, the lower end portion of the jacket tube has a thread that is in engagement with a rotatable mating thread on a threaded connector. This rotatable mating thread is preferably motor-operated. It is translationally fixed relative to the support beam, but in addition to its rotary movement can optionally also be pivoted relative thereto; the latter in order to achieve a height adjustment.

The jacket tube has in some embodiments a circular cross section in the area of its crash member. In some such embodiments, recesses are provided in order to achieve the required yielding property of the crash member. The crash member may be formed in such a way that it can be deflected transversely to its axis independently of angle. This may be achieved by a weakening of the material in the area of the crash member which is independent of the rotation angle, such as isotropic.

In other embodiments, the jacket tube is non-circular in the area in which it cooperates with the slide ring. In such embodiments, the slide ring is correspondingly formed. Torsional forces can thus be absorbed.

Other advantages and features of the invention will become more readily apparent from the following description of embodiments of the invention, which are to be understood not to be limiting and which will be explained in detail below with reference to the drawings.

DETAILED DESCRIPTION OF THE INVENTION

The steering column modules shown in FIGS. 1 to 6 are length adjustable, and, additionally, also adjustable with regard to their height. The coordinates are drawn in FIGS. 1 and 6, this coordinate system also applies to the other figures.

The steering column module comprises a support beam 20 that is usually attached to the vehicle underneath a dashboard (not shown). Suitable means are provided for attachment, for example, the support beam 20 exhibits four mounting holes. The support beam 20 is located in the interior of the motor vehicle.

The steering column module has a steering column that is rotatable about a longitudinal axis 22 and comprises an upper steering tube 24 and a lower steering tube 26. Both have a joint area of overlap. Within this overlap area, the lower steering tube 26 is slid into the upper steering tube 24. Respectively, the cross-section there is non-circular, so that a non-rotatable, but longitudinally displaceable connection, which is also referred to as a slide coupling, is obtained. It is provided at least over the length of the length adjustment area. In this regard, reference is made to the double arrow 27 of FIG. 2. A length of the overlap area greater than required for the length adjustment range is advantageous, for example, an overlap length greater by at least 50%. It is not required during the normal driving operation, but is required in the case of an accident.

Figure 5:
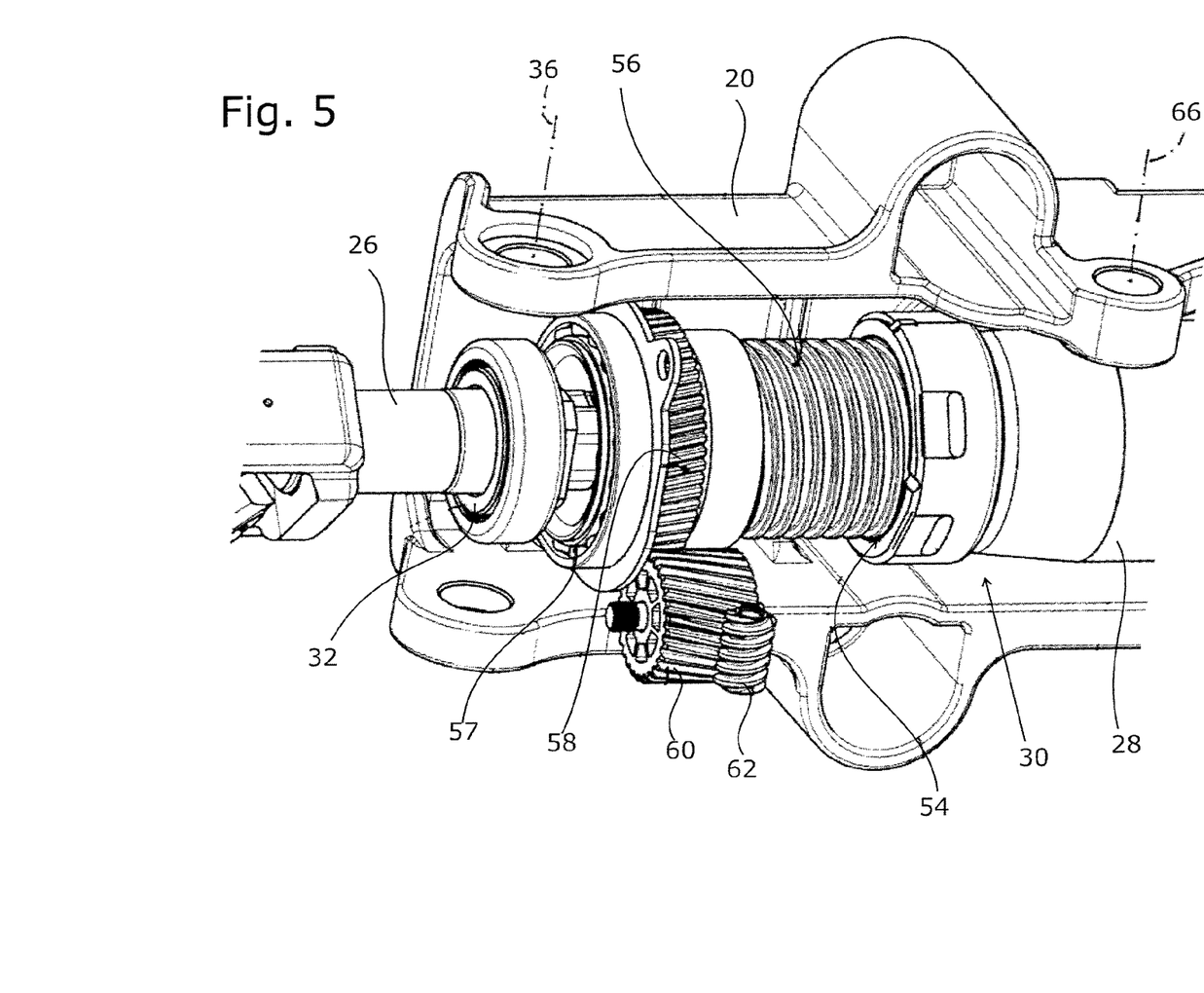
FIG. 5 is a partial perspective view of another embodiment of the present invention showing a drive of the steering adjustment system.

The two steering tubes 24, 26 are grasped by a jacket tube 28. The latter is concentric with the longitudinal axis 22. It has an upper end portion 29 and a lower end portion 30. According to a known manner, the upper end portion 29 is connected to the upper steering tube 24 via an upper rotary bearing 72. The upper rotary bearing 72 is apparent, for example, in FIG. 2, and is located close to the free end of the upper steering tube 24. This free end protrudes freely relative to the jacket tube 28. The lower end portion 30 grasps around the lower steering tube 26. The lower steering tube 26 is mounted in a lower rotary bearing 32, the latter is supported by a swivel part 34. The swivel part 34 is pivotable relative to the support beam 20 about a swivel part axis 36 parallel to the y-direction, FIG. 5 shows axle stubs for this bearing, the swivel part 34 is not shown in FIG. 5 in order to depict the lower rotary bearing 32.

The upper steering tube 24 and/or the lower steering tube 26 may be configured in a tubular manner over their entire length. At least a partial area in the direction of the longitudinal axis 22 may be made from solid material.

Figure 4:
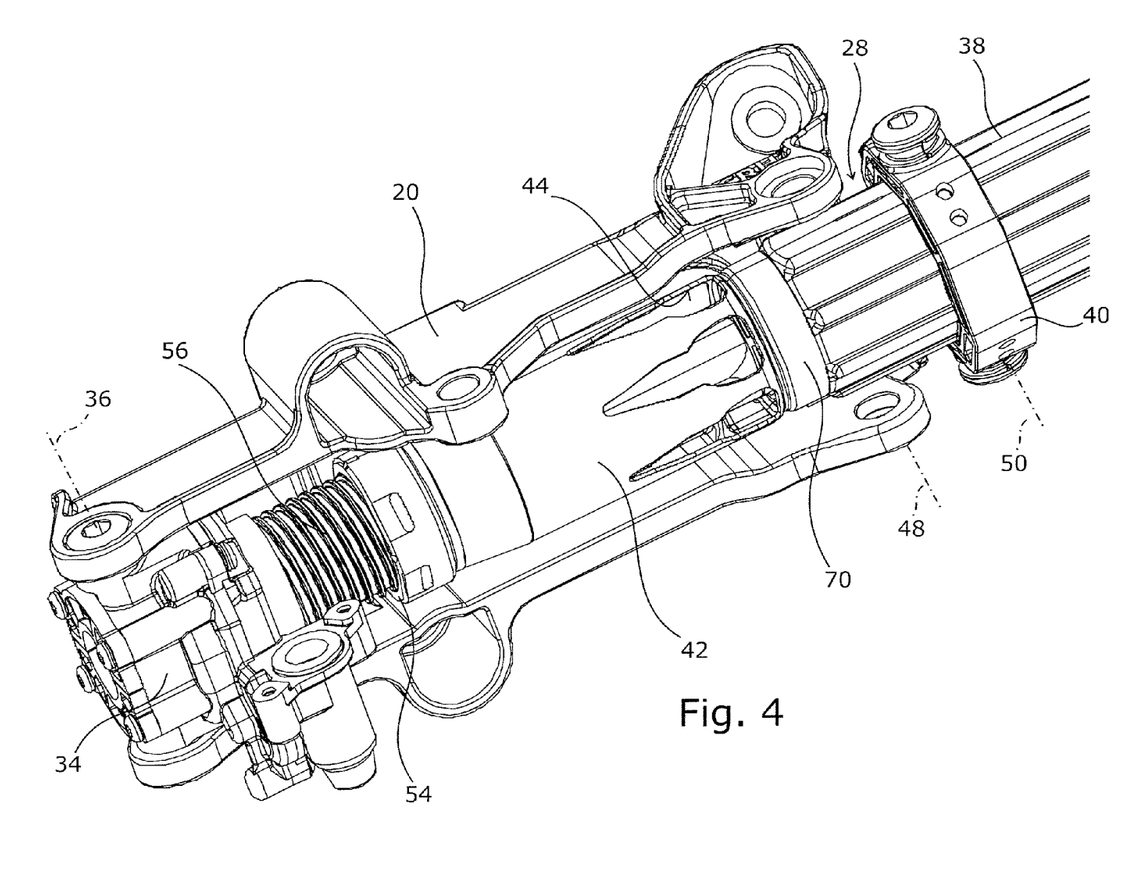
FIG. 4 is a partial perspective view of the steering column module of FIG. 1 with several components removed and showing a support beam, a lower portion of a jacket tube, a slide ring and other components.

The jacket tube 28 has a guiding region 38. It extends in the direction of the longitudinal axis 22 and has a constant external cross-section. The latter may be non-circular. The length of the guiding region 38 corresponds at least to the adjustment distance with allowance. The guiding region 38 is grasped by a slide ring 40. The latter is displaceable relative to the guiding region 38 in the direction of the longitudinal axis 22, but is non-rotatable. As FIG. 4 shows, for example, the guiding region 38 has longitudinal ribs equally distributed over the circumference, for example, eight longitudinal ribs, through which a torsional strength is achieved between the slide ring 40 and the guiding region 38. They extend parallel to the longitudinal axis 22.

A crash member 42 is located between the guiding region 38 and the lower end portion 30. In the area of the crash member 42, the jacket tube 28 has a circular cross-section. It is weakened by recesses 44. They are configured in such a way that the crash member 42 is capable of shortening its axial length in the case of an accident. In another embodiment, the crash member 42 does not have recesses 44 distributed over the circumference as shown, but is uniformly weakened over the entire circumference, that is, has the same wall thickness at any angular position.

Other configurations of the crash member 42 are possible. For example, the crash member 42 can be configured as a latticed tube, or it can be corrugated in the axial direction, i.e., configured as a corrugated tube or bellows.

The crash member 42 may be an integral part of the jacket tube 28. That is, the jacket tube 28 is made integrally. In further embodiments, the jacket tube 28 and its crash member 42 are made from the same material.

As FIG. 4 shows, the crash member 42 is located in the area of the support beam 20, and is thus partially grasped by it. In the direction of the longitudinal axis 22, it does not extend beyond the support beam 20. It is located between the slide ring 40 and the swivel part 34. A short annular area 70 is located between the crash member 42 and the guiding region 38.

A swivel bridge 46 is provided between the support beam 20 and the slide ring 40. The swivel bridge 46 is connected to the support beam 20 via a support beam axis 48 so as to be pivotable, the latter extends parallel to the y-axis. The swivel bridge 46 is connected to the slide ring 40 so as to be pivotable about a swivel bridge axis 50. The latter is also parallel to the y-axis.

The swivel bridge 46 has a bridge area pointing downwards in the z-direction, where a motor-operated actuator acts in an articulated manner. It is configured as a spindle drive. The driving action is provided through the first electric motor 52. If that is actuated, the swivel bridge 46 swivels, this leads to an adjustment of the inclination or an adjustment of the height of the steering column relative to the support beam 20.

The longitudinal adjustment system of the steering column, that is, the adjusting device for adjusting the distance of the upper steering tube 24 from the lower steering tube 26 is described below. The lower end portion 30 has a thread 54 that, in the exemplary embodiment, is configured as an internal thread. A mating thread 56, configured as a cylindrical external thread and formed by a threaded connector, is in engagement therewith. The latter is rotatably mounted on the swivel part 34. The mating thread 56 is concentric to the longitudinal axis 22. A coaxial spur gear 58 is connected with the threaded connector, the gear rotates about the longitudinal axis 22. A worm gear 60, which in turn is driven by a worm 62, is in engagement with this spur gear 58. The worm is driven by a second electric motor 64. With the longitudinal direction, the two electric motors 52, 64 are aligned parallel to the y-direction. They are both located underneath the support beam 20 in the z-direction.

The second electric motor 64 follows the swiveling movement of the lower steering tube 26 when the inclination is adjusted. The first electric motor 52 is disposed on a rocker which is pivotable about a rocker axis 66 extending parallel to the y-direction. The first electric motor 52 swivels together with the rocker supporting it about the rocker axis 66 when the inclination is adjusted. If the length of the steering column is adjusted, the two electric motors 52, 64 do not change their positions.

Figure 1:
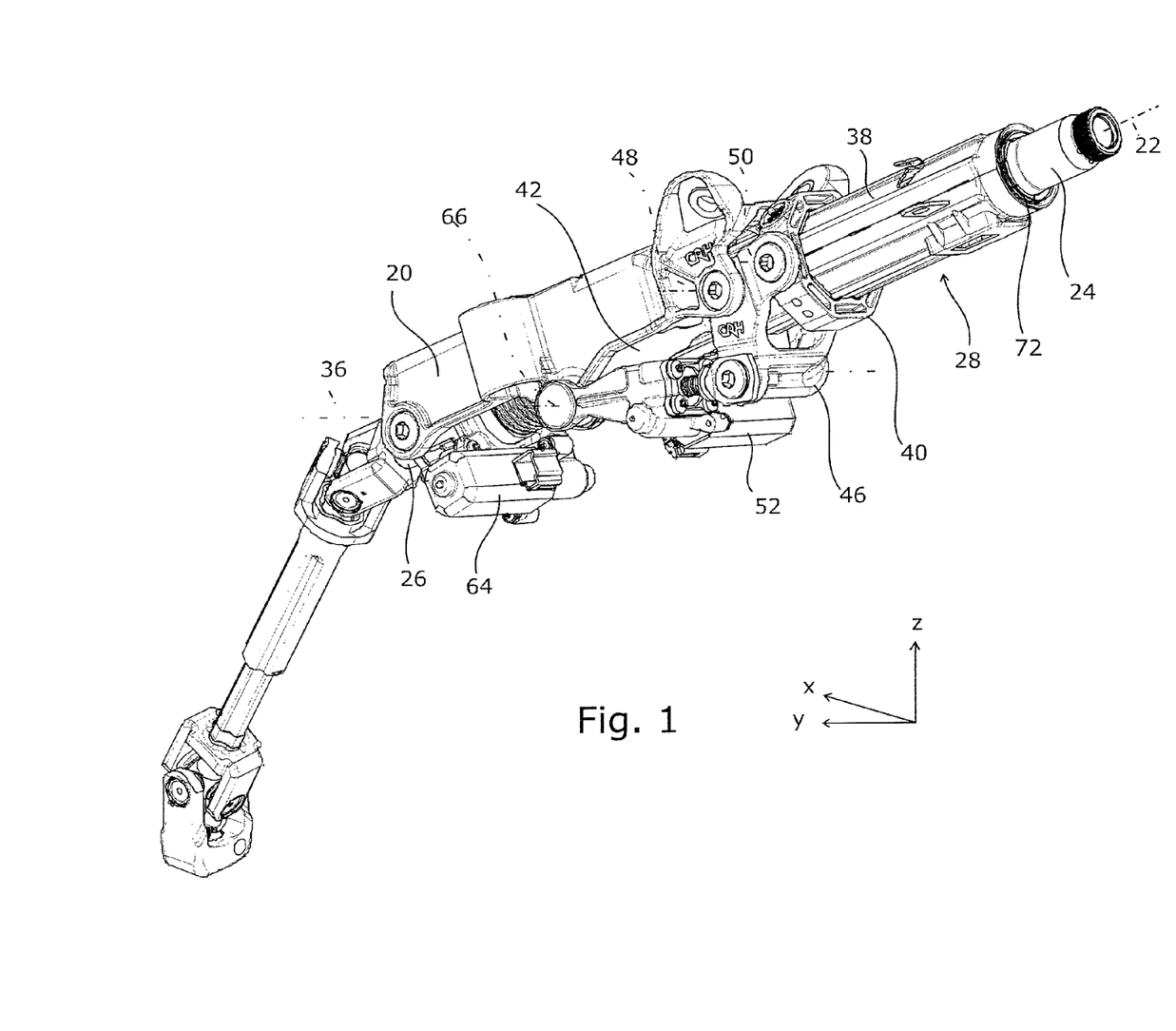
FIG. 1 is a perspective view of a steering column module according to an embodiment of the present invention.
Figure 2:
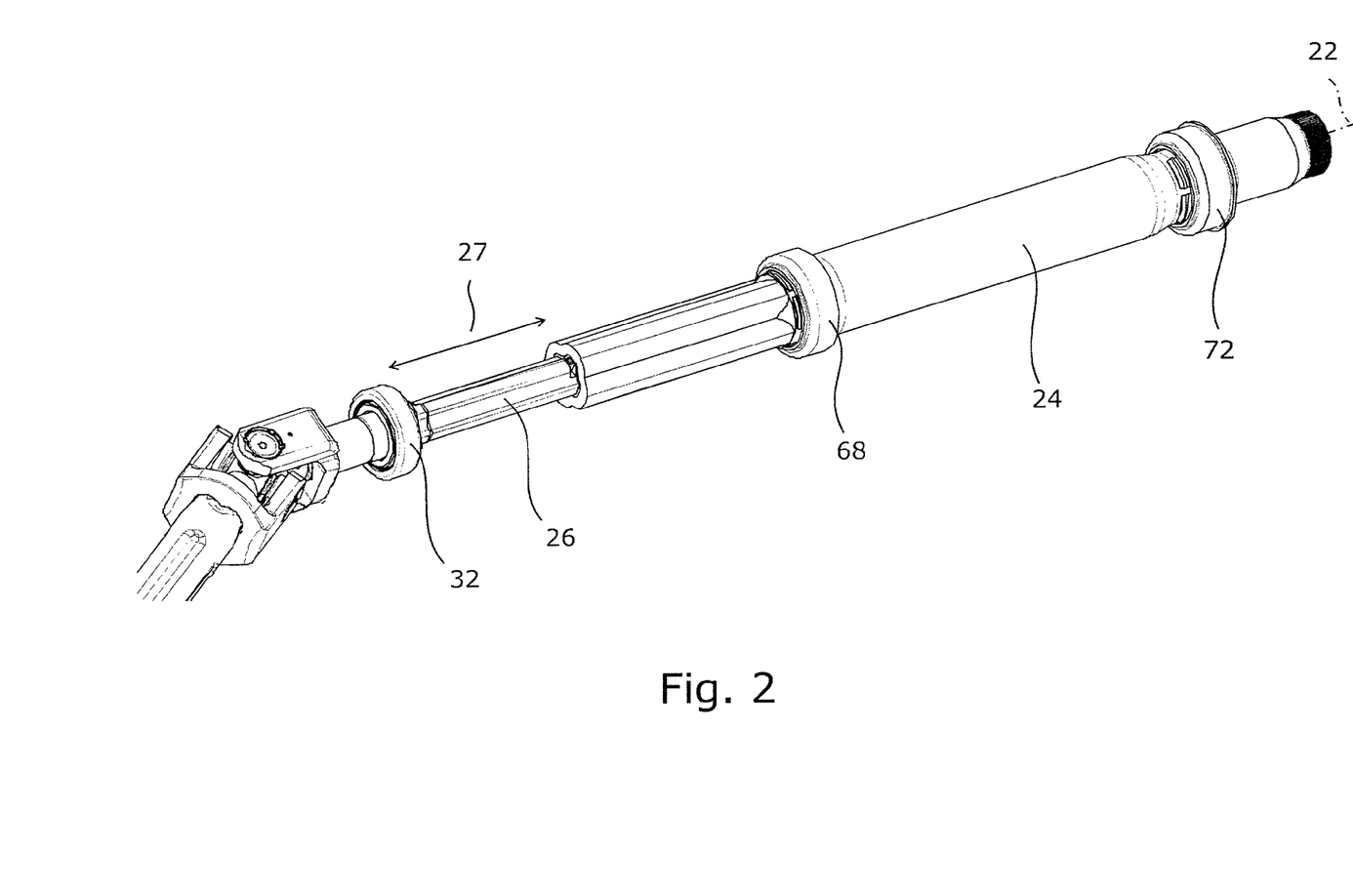
FIG. 2 is a perspective view of the steering column module of FIG. 1 in greater detail.
Figure 3:
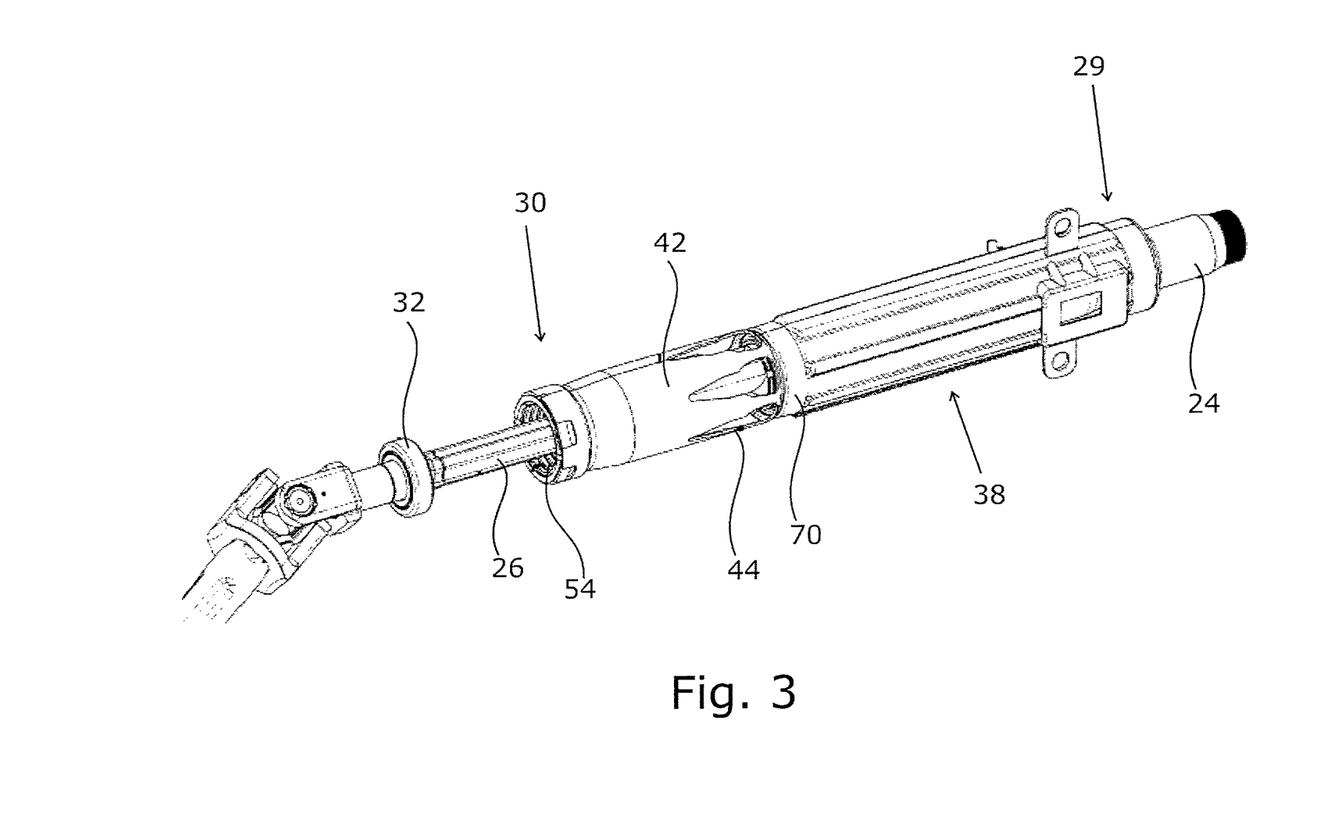
FIG. 3 is a perspective view of a jacket tube and of steering tubes of the steering column module of FIG. 1.

As FIG. 2 shows, the upper steering tube 24 supports a central bearing 68 that is located approximately in the middle between the lower rotary bearing 32 and the bearing at the upper end portion 29. It is grasped and held by the annular area 70 located between the guiding region 38 and the crash member 42. It is located above the crash member 42.

Figure 6:
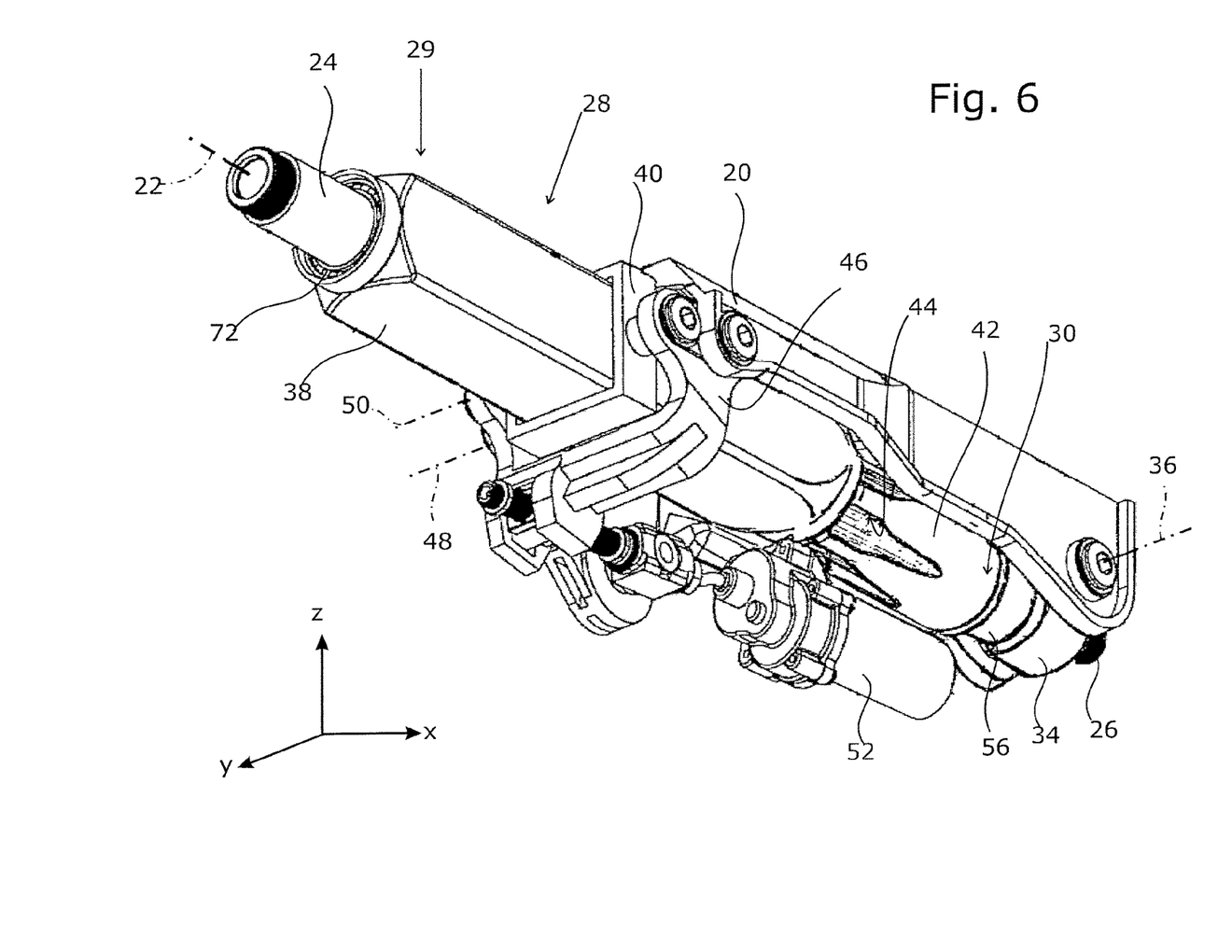
FIG. 6 is a perspective view of another embodiment of the steering column module of the present invention.

In the embodiment of FIG. 6, the guiding region 38 has a square cross-section. The slide ring 40 is also configured accordingly. All features of the embodiment of FIG. 6 that match the features of the embodiments of FIGS. 1-5 are in accordance therewith and like components have like numbering, as such, the components will not be described again. The embodiment according to FIG. 6 can also be configured in such a way that only an inclination adjustment of the steering column module is possible, but not a length adjustment. However, a length adjustment system can also be provided, even though the drive required therefor is not shown in FIG. 6.

Figure 7:
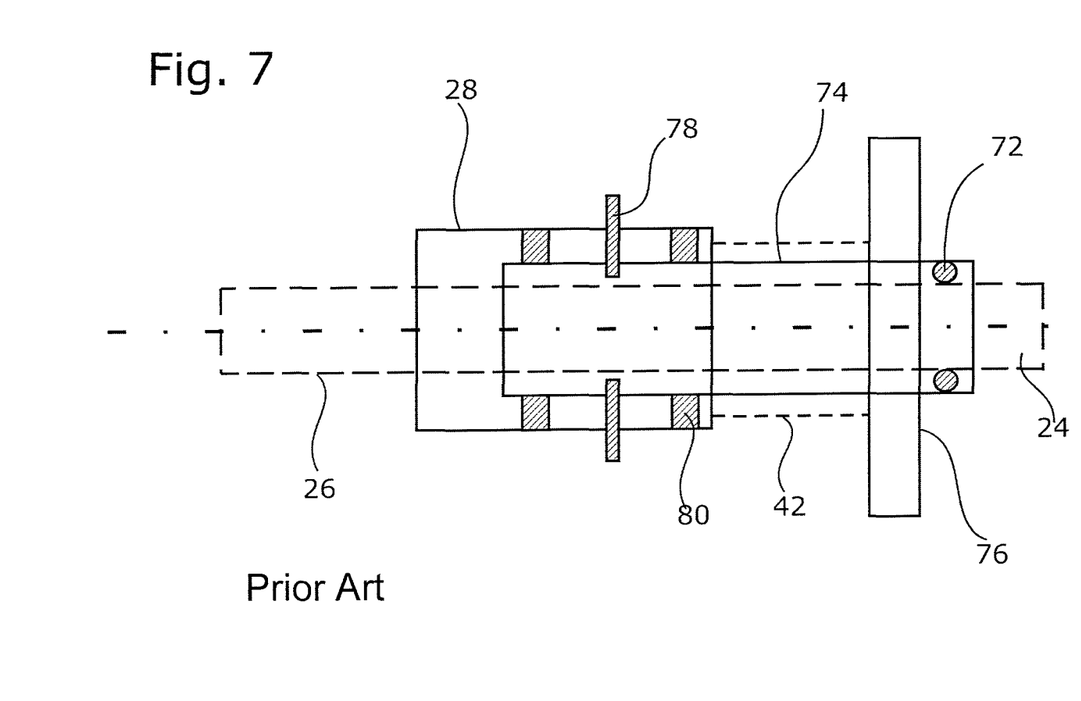
FIG. 7 is a side-view of a steering column module according to the prior art.
Figure 8:
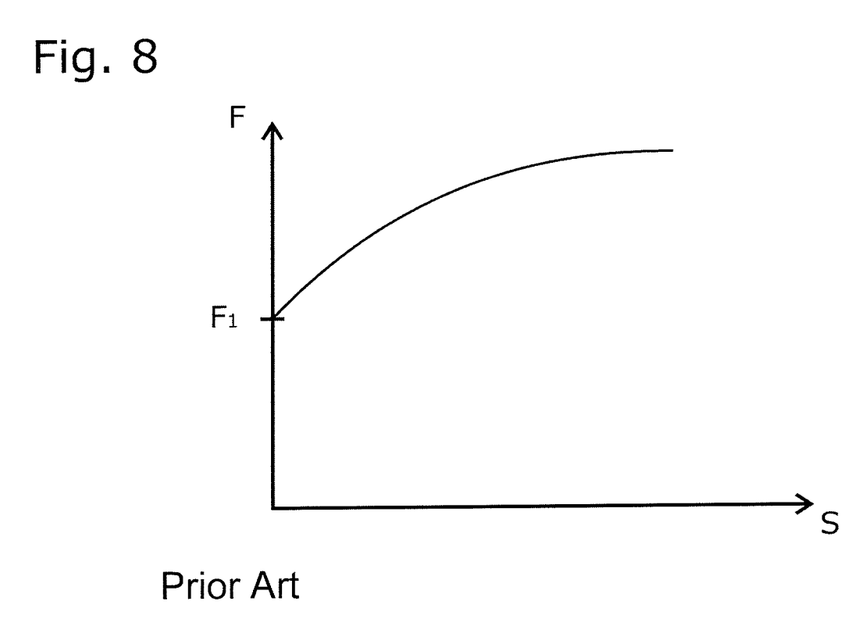
FIG. 8 is a graph diagram showing force (F), in Newtons, versus distance (S), in millimeters, for the steering column module of FIG. 7.

FIGS. 7 and 8 show a prior art configuration in a basic representation. The upper steering tube 24 is rotatably mounted in the upper rotary bearing 72. The upper rotary bearing 72 is disposed between a sliding tube 74 and the upper steering tube 24. The sliding tube 74 is grasped by the crash member 42, which, with its upper, and thus front, end is connected to a force introducing ring 76. The latter is disposed on the sliding tube 74. The jacket tube 28 is configured separately from and in the extension of the crash member 42. A shearing element 78 is provided between the jacket tube 28 and the sliding tube 74. It constitutes the connection between the jacket tube 28 and the sliding tube 74. A tolerance ring 80 is provided at the front upper end of the jacket tube.

In the case of a crash, that is, of an accident with the airbag being triggered, etc., the longitudinal force is introduced into the sliding tube 74 via the upper steering tube 24, the upper rotary bearing 72 and the force introducing ring 76, which is a part of the steering column support beam. The upper steering tube 24 and the lower steering tube 26 form a steering spindle, which is displaceable in the longitudinal direction and mounted rotatably in the sliding tube 74. The force is transmitted, inter alia, at the joint of the force introducing ring 76, the crash member 42, the joint of the crash member 42, and the jacket tube 28.

At a predetermined force threshold value F1, shown in FIG. 8, the shearing element 78 breaks loose. The jacket tube 28 and the sliding tube 74 are connected free from play via the shearing element 78 and the at least one tolerance ring 80. The crash member 42, which is connected to the jacket tube 28, begins to deform starting from the force F1, and is responsible for the shape of the force characteristic curve as it is shown in FIG. 8. The at least one tolerance ring 80 ensures freedom from play during normal operation.

Compared with the prior art system of FIG. 7, there are the following advantages of the present invention: a force introducing ring 76 as a separate part is not a separate requirement anymore. The at least one tolerance ring 80 is omitted. Compared with the previously known system, first, the jacket tube 28, second, the crash member 42, and third, the tolerance ring 80 are not required as separate parts anymore. The force introducing ring 76 is not required as a separate part anymore, and the crash member 42 becomes a multi-functional jacket tube with an integrated crash member. The system according to the present invention may be referred to as a "5-in-1" system. This is to convey the fact that five separate prior art components are advantageously in a multi-functional jacket tube 28 with an integrated crash member 42. In the system according to the invention, the force is introduced via the thread 54 and the mating thread 56. The upper steering tube 24 can not be rotated relative to the lower steering tube 26.

As should be recognized by those of ordinary skill in the pertinent art based on the teachings herein, numerous changes and modifications may be made to the above-described and other embodiments of the present invention without departing from its scope as defined in the appended claims. Accordingly, this detailed description of embodiments is to be taken in an illustrative, as opposed to a limiting, sense.

What is claimed is:

1. A steering column module for a motor vehicle, comprising:
    a support beam configured to be attached to the motor vehicle;
    a steering column defining a longitudinal axis and rotatable thereabout, and having an upper steering tube non-rotatably connected to a lower steering tube, wherein the upper steering tube is displaceable a first distance in a direction of the longitudinal axis;
    an adjusting device for adjusting the distance of the upper steering tube from the lower steering tube;
    a jacket tube having an annular area, a crash member, an upper end portion and a lower end portion, wherein the upper end portion grasps around the upper steering tube, and axially fixes and rotatably supports the upper steering tube, and the upper steering tube protrudes from the jacket tube; and
    a central bearing disposed between the annular area of the jacket tube and the upper steering tube;
    wherein the crash member is located between the central bearing and the lower end portion of the jacket tube;
    wherein the crash member shortens in the event of an accident and a total length of the upper and the lower steering tube is shorter after an accident than before an accident; and
    wherein a y-axis extends in a horizontal plane at an angle of 90° relative to a normal driving direction, for straight travel of a vehicle in said plane, and the support beam defines an axis thereof extending parallel to the y-axis, and further comprising a swivel bridge connected to a slide ring and the support beam and defining a swivel bridge axis at least substantially parallel to the support beam axis, wherein the swivel bridge is pivotable about the support beam axis and the swivel bridge axis.

2. A steering column module as defined in claim 1, wherein the crash member is an integrally made part of the jacket tube.

3. A steering column module as defined in claim 1, wherein the upper steering tube and the lower steering tube have a joint area of overlap; and
    wherein the upper steering tube has an axially extending, first non-circular coupling area and the lower steering tube has an axially extending, second non-circular coupling area, the first non-circular coupling area and the second non-circular coupling area engage each other in the area of overlap over a second distance at least equal to the first distance.

4. A steering column module as defined in claim 1, wherein the slide ring non-rotatably grasps around the jacket tube and is longitudinally displaceable relative thereto.

5. A steering column module as defined in claim 1, wherein the crash member does not protrude axially over the support beam in the direction of the longitudinal axis.

6. A steering column module as defined in claim 1, wherein the lower end portion grasps around the lower steering tube.

7. A steering column module as defined in claim 1, wherein the jacket tube, including the crash member, is made from a single material.

8. A steering column module for a motor vehicle, comprising:
    a support beam configured to be attached to the motor vehicle;
    a steering column defining a longitudinal axis and rotatable thereabout, and having an upper steering tube non-rotatably connected to a lower steering tube, wherein the upper steering tube is displaceable a first distance in a direction of the longitudinal axis;
    an adjusting device for adjusting the distance of the upper steering tube from the lower steering tube;
    a jacket tube having an annular area, a crash member, an upper end portion and a lower end portion, wherein the upper end portion grasps around the upper steering tube, and axially fixes and rotatably supports the upper steering tube, and the upper steering tube protrudes from the jacket tube; and a central bearing disposed between the annular area of the jacket tube and the upper steering tube; wherein:
  the crash member is located between the central bearing and the lower end portion of the jacket tube;
  the crash member shortens in the event of an accident and a total length of the upper and the lower steering tube is shorter after an accident than before an accident; and
  the lower end portion includes a thread; and the steering column module comprises a rotatable mating thread in engagement with the lower end portion thread, wherein the rotatable mating thread is translationally fixed and pivotable relative to the support beam.

9. A steering column module as defined in claim 8, wherein the crash member is an integrally made part of the jacket tube.

10. A steering column module for a motor vehicle, comprising:
  a support beam;
  means for fixing the support beam to the motor vehicle;
  a steering column defining a longitudinal axis and rotatable thereabout, and having an upper steering tube non-rotatably connected to a lower steering tube, wherein the upper steering tube is displaceable in a direction of the longitudinal axis relative to the lower steering tube;
  an adjusting device for adjusting the distance of the upper steering tube from the lower steering tube;
  a jacket tube having an upper end portion and a lower end portion including a thread, wherein the upper end portion grasps around the upper steering tube, axially fixes and rotatably supports the upper steering tube, and protrudes from the jacket tube;
  a swivel part defining a swivel part axis and pivotable relative to the support beam about the swivel part axis, the swivel part axis extending parallel to a y-direction, wherein the y-direction extends in a horizontal plane at an angle of 90° relative to a normal driving direction, for straight travel of a vehicle in said plane; and
  a threaded connector engaged with the thread of the lower end portion and rotatably arranged on the swivel part about a rotation axis coaxial with the longitudinal axis.

* * * * *